United States Patent
Uihlein

(10) Patent No.: US 7,644,565 B2
(45) Date of Patent: Jan. 12, 2010

(54) LAWNMOWER ATTACHMENT DEVICE FOR MOUNTING AN EDGE TRIMMER THERETO AND METHOD OF MOUNTING SAME

(75) Inventor: William J. Uihlein, 174-41 Pidgeon Meadow Rd., Flushing, NY (US) 11365-1138

(73) Assignee: William J. Uihlein, Flushing, NY (US)

( * ) Notice: Subject to any disclaimer, the term of this patent is extended or adjusted under 35 U.S.C. 154(b) by 0 days.

(21) Appl. No.: 11/737,811

(22) Filed: Apr. 20, 2007

(65) Prior Publication Data

US 2008/0256917 A1    Oct. 23, 2008

(51) Int. Cl.
*A01D 34/00* (2006.01)

(52) U.S. Cl. .................. 56/13.7; 56/12.7; 56/13.5; 56/15.6; 56/DIG. 9

(58) Field of Classification Search ............ 56/12.7, 56/13.5–13.7, 1, 14.9, 15.6, 16.7, DIG. 9
See application file for complete search history.

(56) References Cited

U.S. PATENT DOCUMENTS

| | | | | |
|---|---|---|---|---|
| 1,692,185 A * | 11/1928 | Paine et al. | ................ | 56/249 |
| 2,118,199 A * | 5/1938 | Healy | ................ | 451/423 |
| 2,790,292 A * | 4/1957 | Trecker | ................ | 56/16.9 |
| 2,914,829 A * | 12/1959 | Willemain | ................ | 248/229.15 |
| 4,152,882 A | 5/1979 | Howard | | |
| 4,442,659 A * | 4/1984 | Enbusk | ................ | 56/12.7 |
| 5,136,830 A * | 8/1992 | Langdon | ................ | 56/320.1 |
| 5,303,532 A * | 4/1994 | Phillips | ................ | 56/12.7 |
| 5,561,969 A * | 10/1996 | Sandy | ................ | 56/13.6 |
| 5,694,752 A * | 12/1997 | Warfield, III | ................ | 56/13.6 |
| 5,802,824 A | 9/1998 | Aldrich | | |
| 6,032,443 A | 3/2000 | Aldrich | | |
| 6,094,896 A | 8/2000 | Lane | | |
| 6,343,461 B1 | 2/2002 | Knott | | |
| 6,494,445 B1 * | 12/2002 | Bellis, Jr. | ................ | 269/71 |
| 6,601,374 B2 * | 8/2003 | Smith | ................ | 56/13.6 |
| 6,715,272 B2 * | 4/2004 | Stahl | ................ | 56/233 |
| 6,892,518 B1 | 5/2005 | Bares | | |
| 6,966,168 B1 | 11/2005 | Kerr, Sr. | | |
| 6,986,238 B1 * | 1/2006 | Bloodworth | ................ | 56/12.7 |
| 7,028,455 B1 * | 4/2006 | Liguras | ................ | 56/13.6 |
| 7,165,383 B1 | 1/2007 | Luton, Jr. | | |
| 2004/0237491 A1 * | 12/2004 | Heighton et al. | ................ | 56/12.7 |
| 2006/0021314 A1 * | 2/2006 | Hatfield | ................ | 56/12.7 |
| 2006/0207235 A1 * | 9/2006 | Izatt et al. | ................ | 56/13.7 |

* cited by examiner

*Primary Examiner*—Thomas B Will
*Assistant Examiner*—Joan D Misa
(74) *Attorney, Agent, or Firm*—F. Chau & Associates, LLC

(57) ABSTRACT

A device for mounting an edge trimmer to a lawnmower, comprising a front clamp mounted to the lawnmower, and a rear clamp mounted to the lawnmower, wherein the front and rear clamps receive and support a shaft of the edge trimmer, and are adjustable to different angles with respect to a first axis substantially parallel to a surface on which the lawnmower rests.

17 Claims, 11 Drawing Sheets

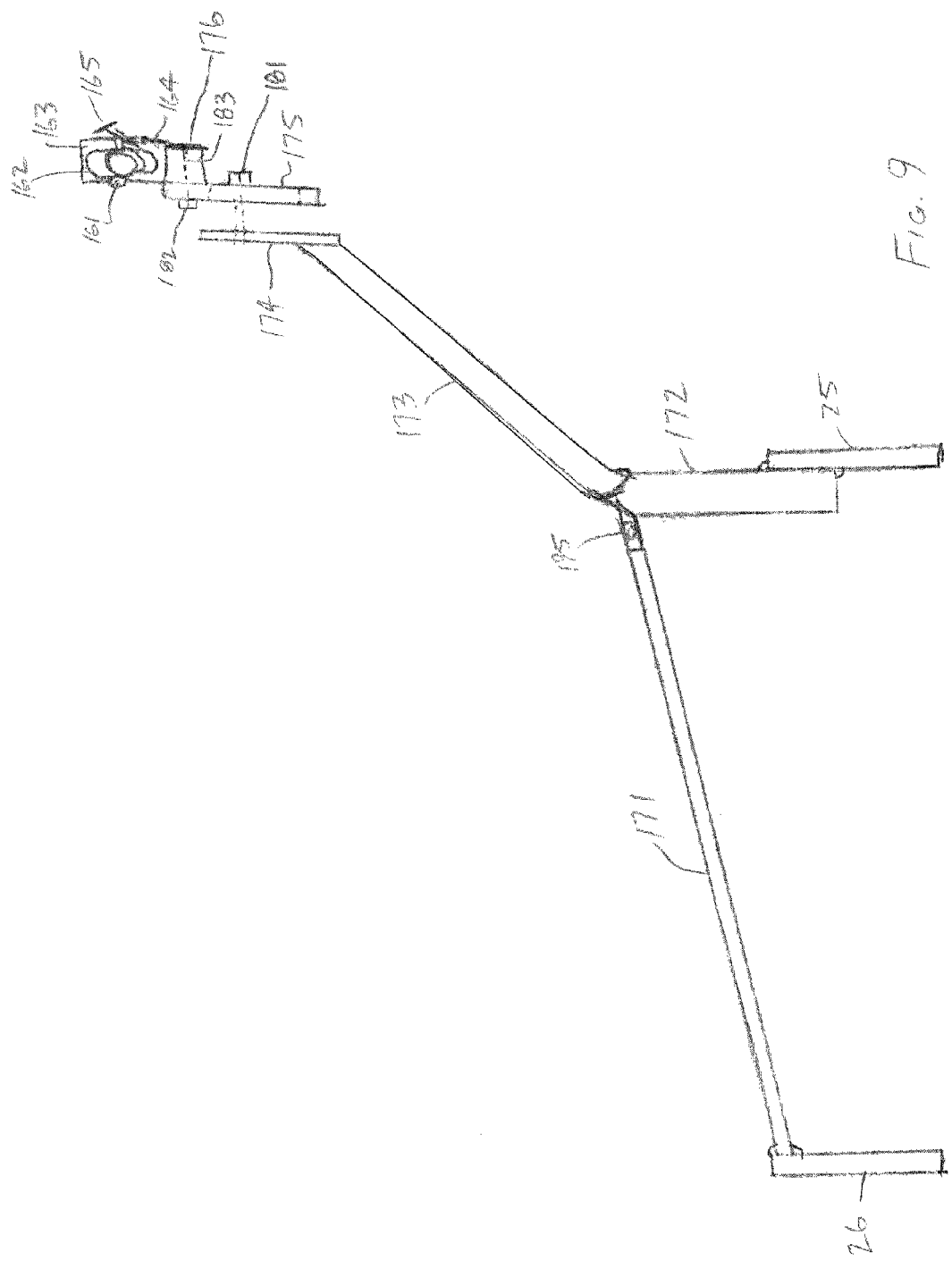

LAWNMOWER ATTACHMENT DEVICE FOR MOUNTING AN EDGE TRIMMER THERETO AND METHOD OF MOUNTING SAME

BACKGROUND OF THE INVENTION

1. Technical Field

The present disclosure relates to an attachment device used for mounting an edge trimmer to a lawnmower, and more particularly, to an attachment device used to mount an edge trimmer to a push or self-propelled type lawnmower.

2. Discussion of the Related Art

Lawnmowers are widely used by homeowners and by commercial services. Traditional lawnmowers include, for example, push and self-propelled types. When cutting grass, it is also desirable to cut the edges of the lawn along sidewalks, fences, and around trees and shrubs. Edges may be cut using an edge trimmer that allows a user to get closer than the lawnmower to a structure around which the grass needs to be trimmed.

Conventional edge trimmers may have a string or cable type line or plastic blades, and can be powered by a gasoline engine, or by electric power. The edge trimmer, for example, sold under the WEEDWACKER trademark, is sold separately, and used separately from a lawnmower.

Maintaining the aesthetics of one's property can be labor intensive, especially when faced with physical ailments, such as back problems. Carrying the weight of an edge trimmer and performing the edge trimming operation separately from mowing with a lawnmower, can cause fatigue and is time consuming.

Known attempts to combine a lawnmower with an edge trimmer have resulted in expensive and cumbersome machines that take up large amounts of space. In addition, consumers would rather use and modify their existing equipment at less cost, rather than buy more expensive or cumbersome units.

Therefore, a need exists for an attachment device that can be added to an existing lawnmower to mount a standard edge trimmer thereto.

SUMMARY OF THE INVENTION

A device for mounting an edge trimmer to a lawnmower, in accordance with an embodiment of the present invention, comprises a front part coupled to the lawnmower, and a rear part coupled to the lawnmower, wherein the front and rear parts include respective front and rear clamps for receiving a shaft of the edge trimmer, and wherein the front clamp is adjustable to be fixed at different positions along a first axis.

The front clamp may be adjustable to be fixed at different positions along a second axis substantially perpendicular to the first axis, and fixed at different angles with respect to a second axis substantially perpendicular to the first axis.

The front clamp can be fixed to a bracket that rotates to and is fixable at the different angles, and fixed to a bracket that moves to and is fixable at the different positions along the first axis.

The rear clamp can be adjustable to be fixed at different positions along the first axis, and at different angles with respect to the second axis.

The rear clamp can be fixed to a bracket that rotates to and is fixable at the different angles, and fixed to a bracket that moves to and is fixable at the different positions along the first axis.

The bracket that moves to and is fixable at the different positions along the first axis can be fixable to a second bracket aligned substantially parallel to the bracket, wherein the second bracket extends from a shaft oriented at an angle with respect to a base of the lawnmower.

The front and rear clamps may each include top and bottom portions that are attached to each other by a hinge to open and close the clamps.

A device for mounting an edge trimmer to a lawnmower, in accordance with an embodiment of the present invention, comprises a front clamp mounted to the lawnmower, and a rear clamp mounted to the lawnmower, wherein the front and rear clamps receive and support a shaft of the edge trimmer, and are adjustable to different angles with respect to a first axis substantially parallel to a surface on which the lawnmower rests.

The front and rear clamps can be adjustable to different positions along a second axis substantially perpendicular to the first axis, and can be adjustable to different positions along the first axis.

The front and rear clamps may be each fixed to a bracket that rotates to and is fixable at the different angles, and each fixed to a bracket that moves to and is fixable at the different positions along the second axis.

The front and rear clamps may each include top and bottom portions that are attached to each other by a hinge to open and close the clamps.

The rear clamp may be aligned with the front clamp so that the shaft of the edge trimmer received by the front and rear clamps extends across a front of the lawnmower to a lateral side of the lawnmower.

A device for mounting an edge trimmer to a lawnmower, in accordance with an embodiment of the present invention, comprises a clamp mounted to the lawnmower, wherein the clamp receives and supports a shaft of the edge trimmer, and is adjustable to different angles with respect to a first axis substantially parallel to a surface on which the lawnmower rests.

The clamp may be adjustable to different positions along a second axis substantially perpendicular to the first axis.

BRIEF DESCRIPTION OF THE DRAWINGS

Exemplary embodiments of the present invention will be described below in more detail, with reference to the accompanying drawings:

FIG. 9 shows a rear view of a rear part of the attachment device, according to an embodiment of the present invention;

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

Embodiments of the present invention provide an attachment device for attaching an edge trimmer to a lawnmower so that mowing and edging operations can be simultaneously performed. Utilizing standard lawnmowers, including, but not limited to LAWN BOY and TORO, with standard lawnmower bases, a standard edge trimmer can be mounted to the lawnmower using the attachment device in accordance with the embodiments of the present invention.

Figure 1:
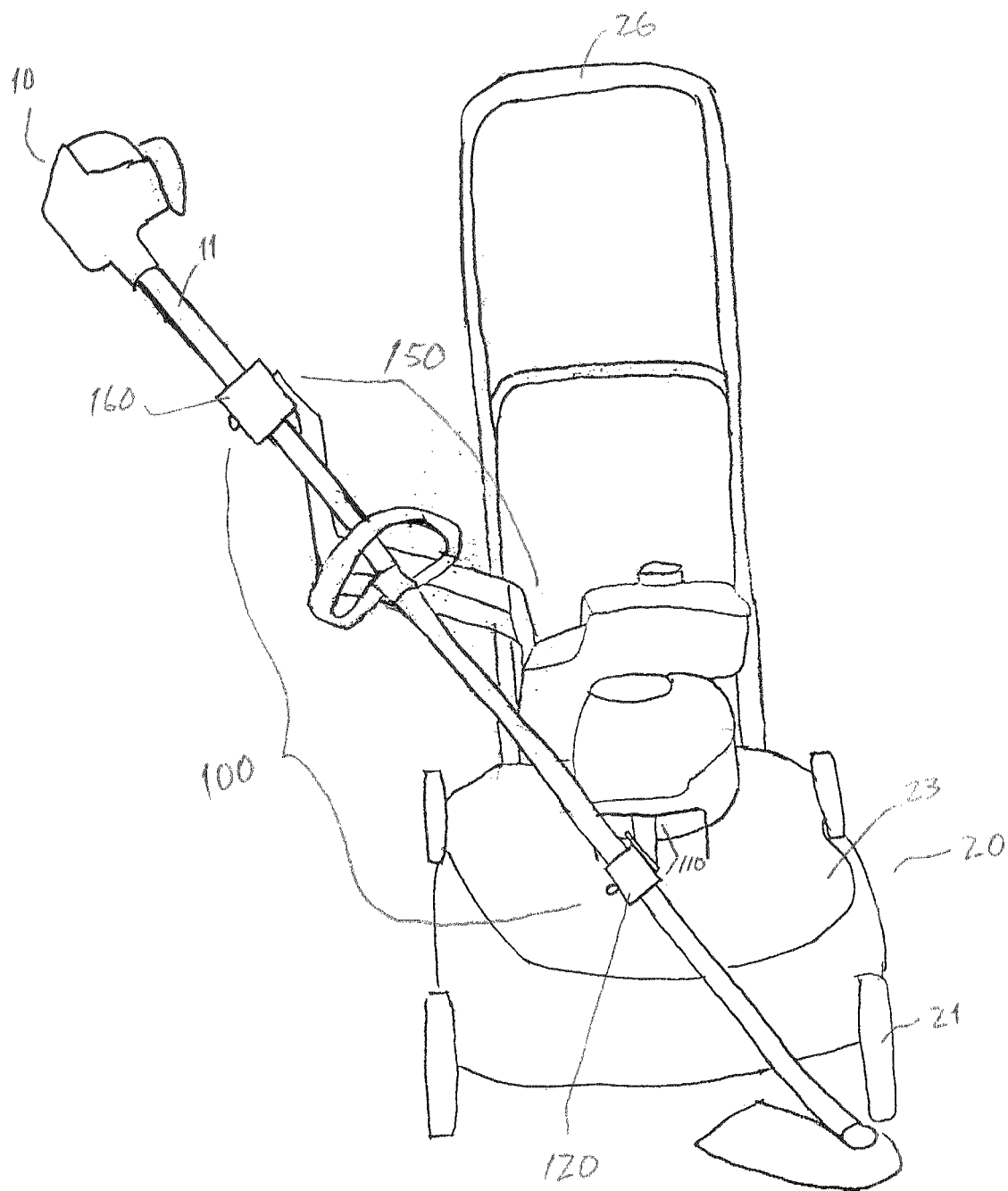
FIG. 1 shows an edge trimmer attached to a lawnmower using an attachment device, according to an embodiment of the present invention.
Figure 2:
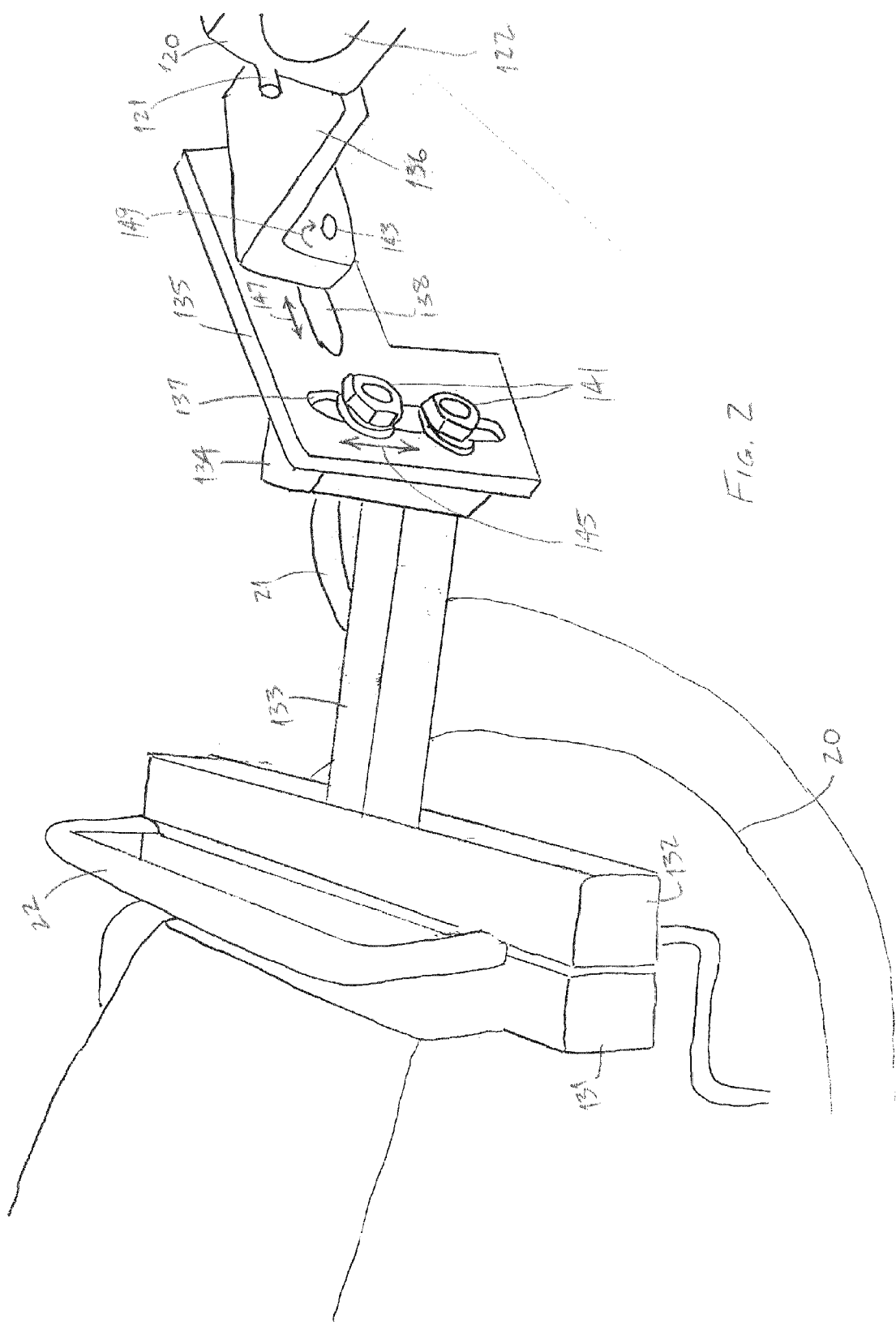
FIG. 2 shows a right-side perspective view of a front part of the attachment device, according to an embodiment of the present invention.
Figure 3:
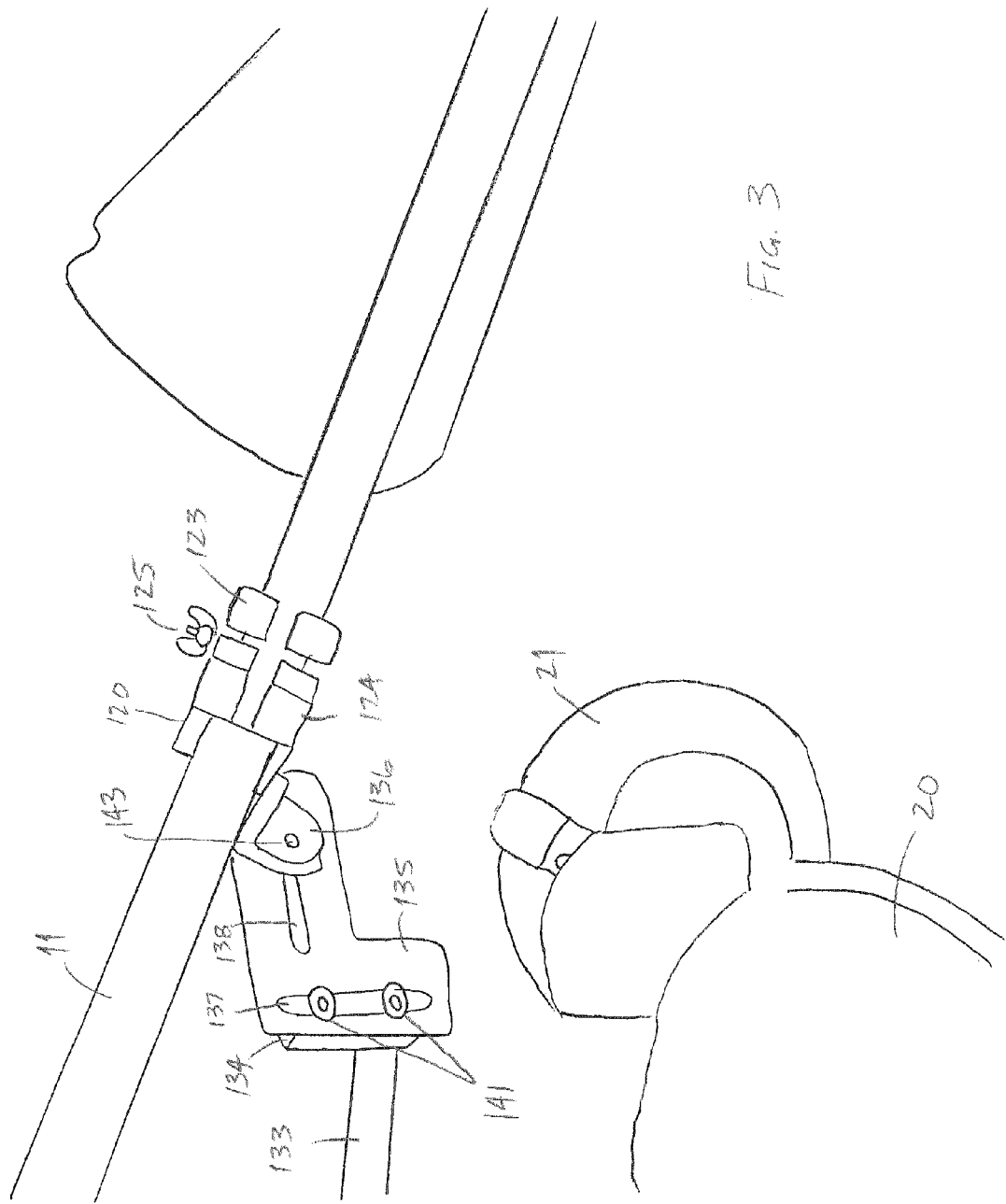
FIG. 3 shows a right-side perspective view of a front part of the attachment device including an edge trimmer mounted thereto, according to an embodiment of the present invention.
Figure 4:
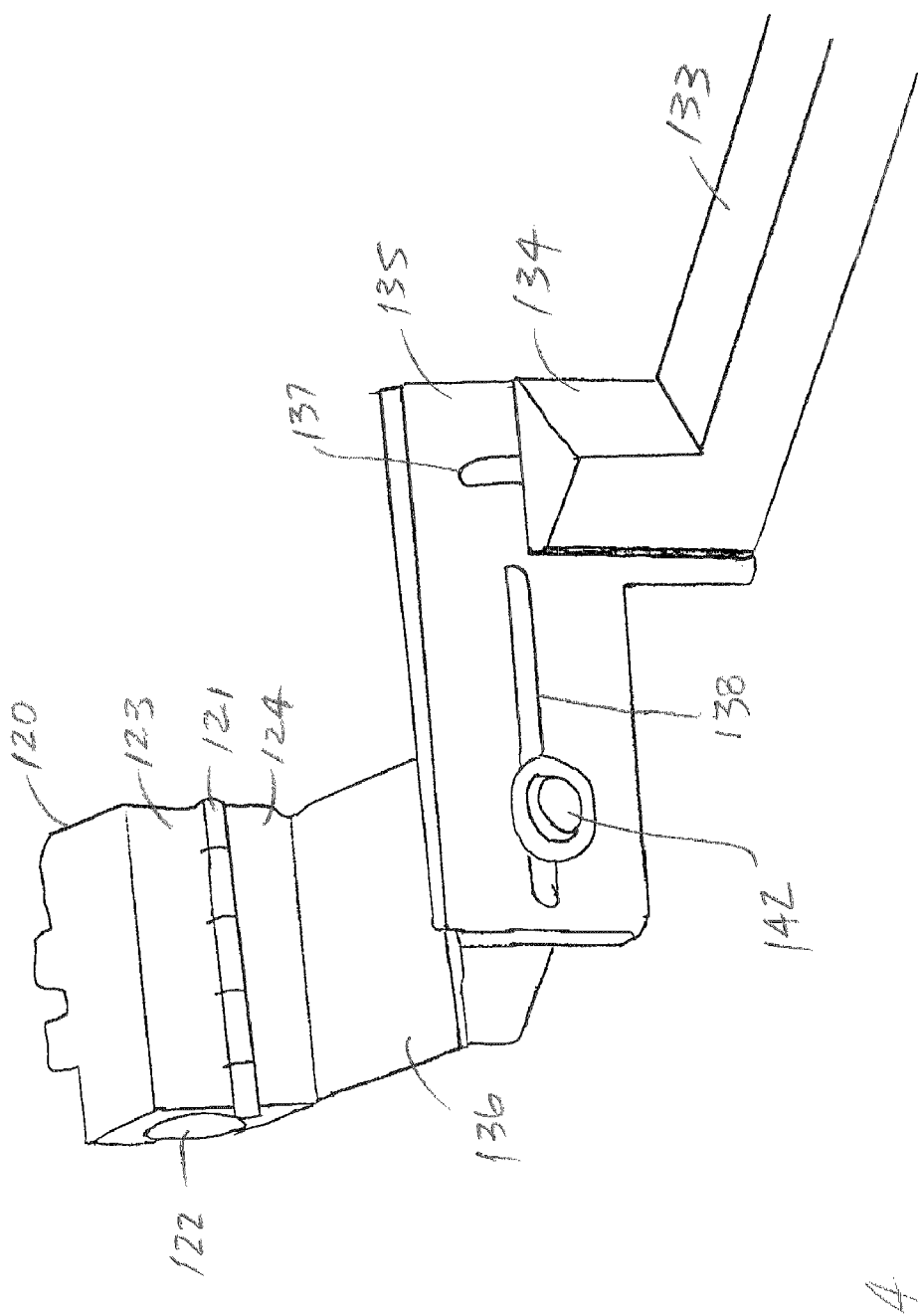
FIG. 4 shows a left-side perspective view of a front part of the attachment device, according to an embodiment of the present invention.
Figure 5:
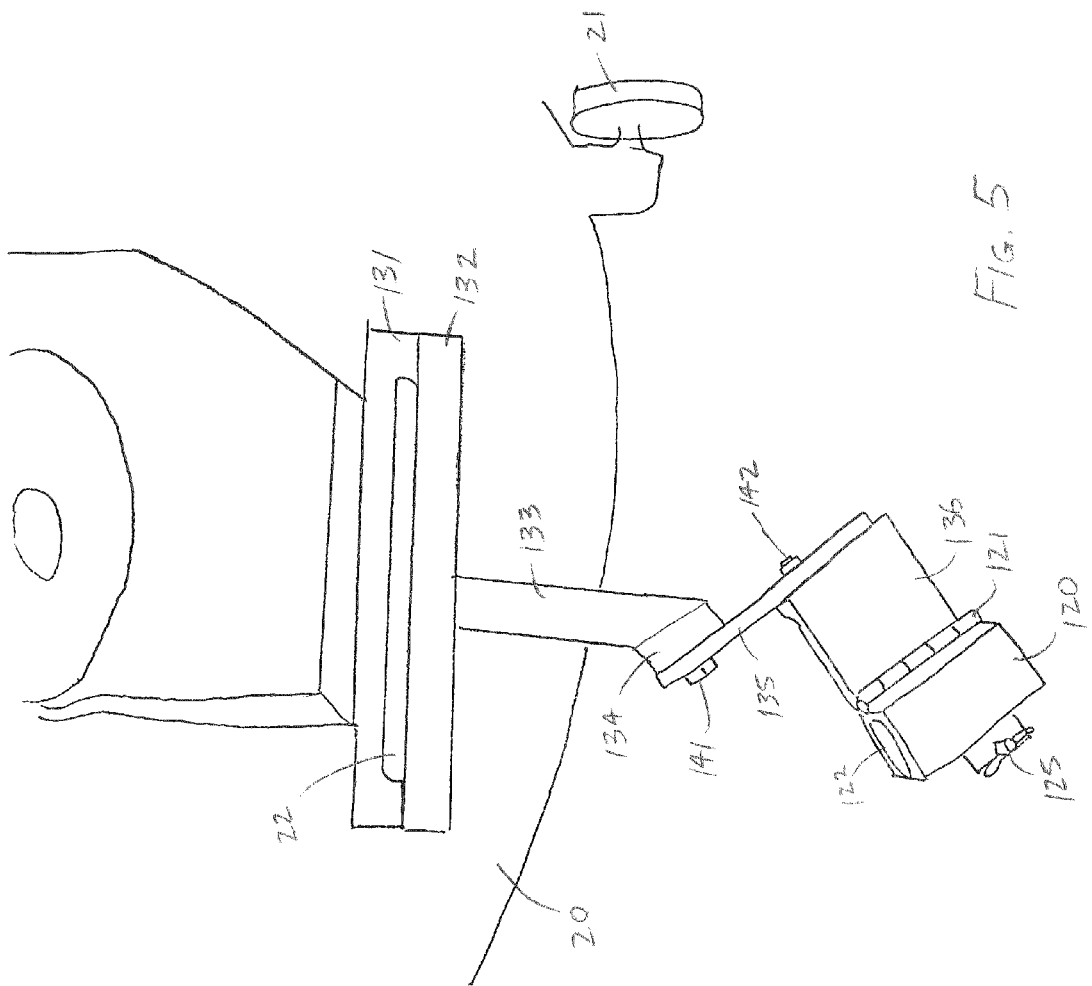
FIG. 5 shows a top perspective view of a front part of the attachment device, according to an embodiment of the present invention.
Figure 6:
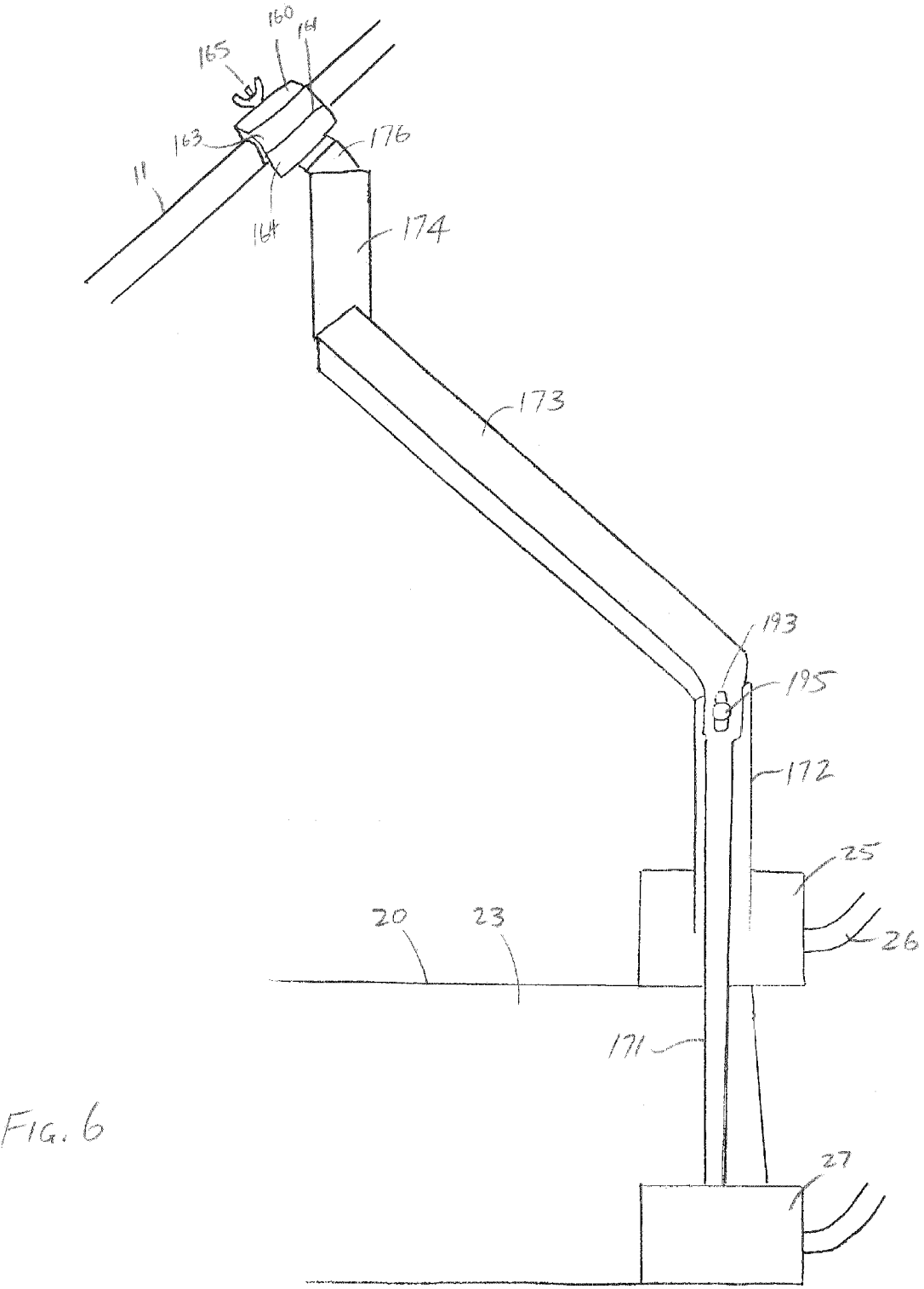
FIG. 6 shows a left-side perspective view of a rear part of the attachment device including an edge trimmer mounted thereto, according to an embodiment of the present invention.
Figure 7:
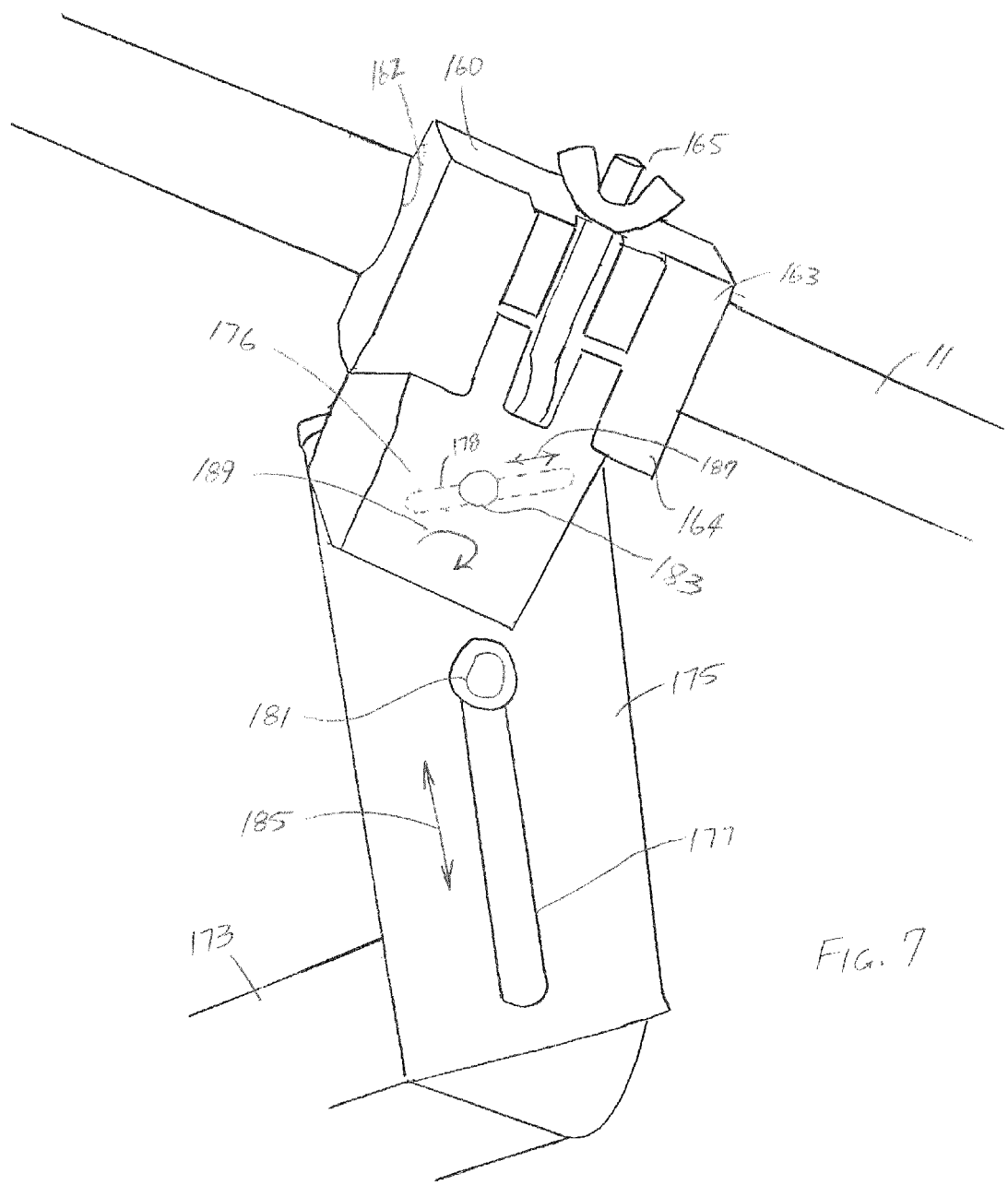
FIG. 7 shows a right-side perspective view of a rear part of the attachment device including an edge trimmer mounted thereto, according to an embodiment of the present invention.
Figure 8:
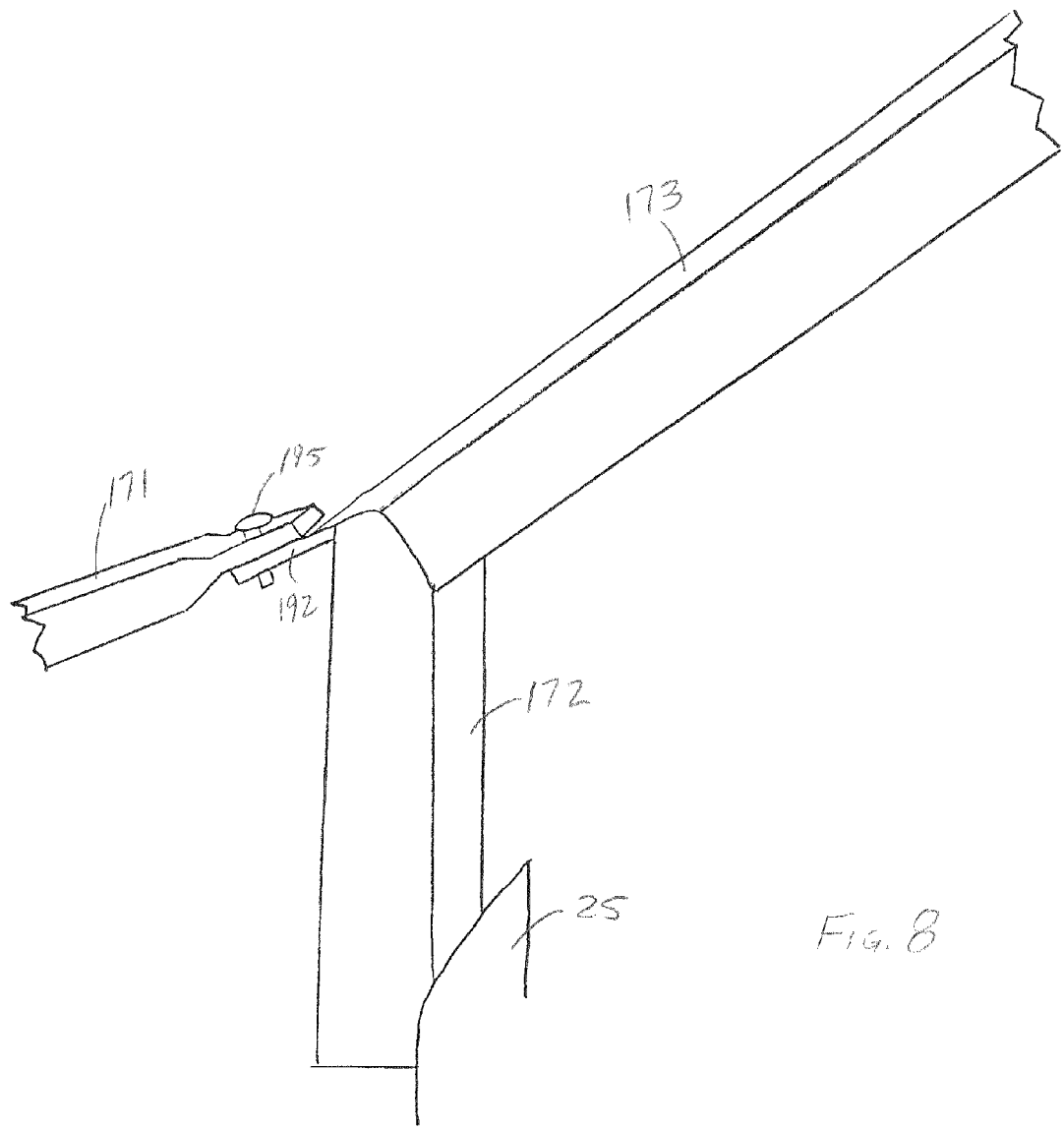
FIG. 8 shows a rear perspective view of a rear part of the attachment device, according to an embodiment of the present invention.
Figure 10A:
FIGS. 10A-10C show top, side and bottom views, respectively, of a cross brace of a rear part of the attachment device, according to an embodiment of the present invention.
Figure 10B:
Figure 10C:
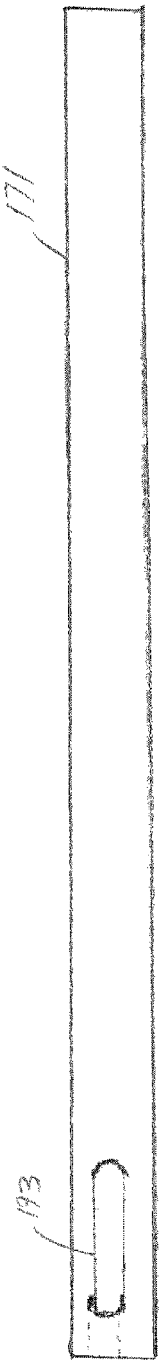

Referring to FIG. 1, an edge trimmer 10 is mounted to a lawnmower 20 using an attachment device 100 according to an embodiment of the invention. The attachment device includes a front part 110 and a rear part 150. Front and rear parts 110, 150 each include a clamp 120 and 160, respectively, around which a shaft 11 of an edge trimmer 10 is enclosed. According to an embodiment of the present invention, the clamps 120 and 160 are the same or substantially the same.

Referring to FIGS. 2-5, a main support shaft 133 extends from an outside front bracket 132. The outside front bracket 132 is mounted to a lower handle 22 of the lawnmower 20 by coupling the outside front bracket 132 to an inside front bracket 131 around the handle 22. The outside front bracket 132 is coupled to the inside front bracket 131 via, for example, screws, bolts or other fixing device penetrating through holes in the inside and outside front brackets 131, 132. The main support shaft 133 can be molded as one piece with the outside front bracket 132, welded to the outside front bracket 132, or fixed to the outside front bracket 132 using screws, bolts, or other fixing device. It is to be understood that the main support shaft 133 can be coupled to the lawnmower 20 in a variety of ways, and is not limited to the configuration shown. For example, the main support shaft 133 can be directly coupled to the lawnmower base 23 or to a structure protruding from the lawnmower base, such as, for example, a shaft extending substantially perpendicular to the lawnmower base 23 and to the main support shaft 133.

The main support shaft 133 is coupled to a vertical support shaft 134. The vertical support shaft 134 can be molded as one piece with the main support shaft 133, welded to the main support shaft 133, or fixed to the main support shaft 133 using screws, bolts, or other fixing device. The vertical support shaft 134 attaches to an L-shaped bracket 135 using screws, bolts, or other adjustable fixing device 141, and includes holes to receive the adjustable fixing devices 141. The L-shaped bracket 135 includes a groove 137 so that the L-shaped bracket can be adjusted to different positions along the vertical axis as shown by arrow 145. The L-shaped bracket 135 attaches to clamp bracket 136 using a screw, bolt, or other adjustable fixing device 142. The clamp bracket 136 includes a hole 143 to receive the adjustable fixing device 142. The L-shaped bracket 135 includes a groove 138 so that the clamp bracket 136 can be adjusted to different positions along the horizontal axis as shown by arrow 147. Further, the clamp bracket 136 can also be adjusted to different angles with respect to the horizontal axis as shown by arrow 149.

The clamp 120 is coupled to the clamp bracket 136. The clamp 120 can be molded as one piece with the clamp bracket 136, welded to the clamp bracket 120, or fixed to the clamp bracket 136 using screws, bolts, or other fixing device. Accordingly, the interaction between the vertical support shaft 134, L-shaped bracket 135 and clamp bracket 136 allows for adjustment of the clamp 120 along the vertical and horizontal axes, and of the pitch or angle of the clamp 120 with respect to the horizontal axis.

The clamp 120 includes top and bottom portions 123, 124 that are attached to each other via a hinge 121. The clamp 120 opens by separating the top and bottom portions via the hinge 121. When the clamp 120 is open, the shaft 11 of an edge trimmer 10 can be placed in the clamp 120. When closed, the clamp 120, which includes a hollowed out portion 122 to receive the shaft 11, fits around the shaft 11 and is held closed by a wing nut 125 or other fixing device.

As a result, an edge trimmer mounted to the front part 110 is adjustable along the vertical and horizontal axes, and can be angled with respect to the horizontal axis along with the clamp 120. Further, the shaft 11 can be turned and/or telescoped in and out while in the clamp 120 (i.e., prior to fully tightening the clamp 120), to change the position of the edge trimmer 10, as shown, for example, by the different position of the edge trimmer 10 between FIGS. 1 and 3.

A rear part 150 of the attachment device 100 is described hereinafter with reference to FIGS. 6-11. Like the clamp 120, the rear part 150 includes clamp 160, which is the same or substantially the same as the clamp 120. The clamp 160 includes top and bottom portions 163, 164 that are attached to each other via a hinge 161. The clamp 160 opens by separating the top and bottom portions via the hinge 161. When the clamp 160 is open, the shaft 11 of an edge trimmer 10 can be placed in the clamp 160. When closed, the clamp 160, which includes a hollowed out portion 162 to receive the shaft 11, fits around the shaft 11 and is held closed by a wing nut 165 or other fixing device.

Similar to the clamp bracket 136, a clamp bracket 176 attaches to outside vertical bracket 175 using a screw, bolt, or other adjustable fixing device 182. The clamp bracket 176 includes a hole 183 to receive the adjustable fixing device 182. The outside vertical bracket 175 includes a groove 178 so that the clamp bracket 176 can be adjusted to different positions along the horizontal axis as shown by arrow 187. Further, the clamp bracket 176 can also be adjusted to different angles with respect to the horizontal axis as shown by arrow 189.

Inside vertical bracket 174 attaches to outside vertical bracket 175 using screws, bolts, or other adjustable fixing device 181, and includes a hole to receive an adjustable fixing device(s) 181. The outside vertical bracket 175 includes a groove 177 so that the outside vertical bracket 175 can be adjusted to different positions along the vertical axis as shown by arrow 185. According to an embodiment, the inside vertical bracket 174 may also include a groove that corresponds to groove 177. In addition, according to an embodiment, the groove 178 can be omitted.

The inside vertical bracket 174 is coupled to angled support shaft 173. The inside vertical bracket 174 can be molded as one piece with the angled support shaft 173, welded to the angled support shaft 173, or fixed to the angled support shaft 173 using screws, bolts, or other fixing device. The angled support shaft 173 extends at an angle from a vertical brace 172. The angled support shaft 173 can be molded as one piece with the vertical brace 172, welded to the vertical brace 172, or fixed to the vertical brace 172 using screws, bolts, or other fixing device. The vertical brace 172 is coupled to a right hinge plate 25 to which a push-handle 26 of the lawnmower is coupled. The vertical brace 172 is welded to the right hinge plate 25, or fixed to the right hinge plate using screws, bolts, or other fixing device. Alternatively, the vertical brace 172 can be coupled to lawnmower base 23 via a welded connection or screws, bolts or other fixing device. The angle at which the angled support shaft 173 extends from the vertical brace 172 can vary depending on the type of lawnmower.

It is to be understood that the angled support shaft 173 can be coupled to the lawnmower 20 in a variety of ways, and is not limited to the configuration shown. For example, the angled support shaft 173 can be directly coupled to the lawnmower base 23.

Figure 11:
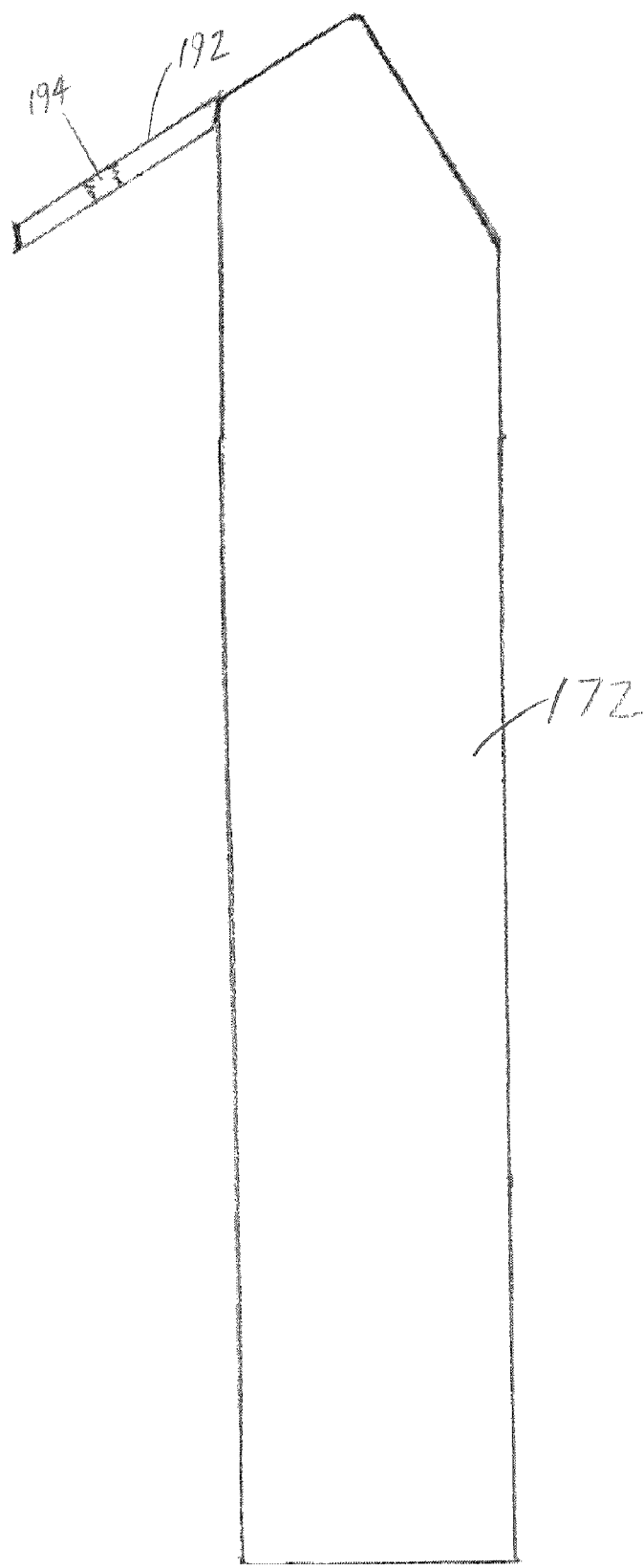
FIG. 11 shows a rear view of a lower support of a rear part of the attachment device, according to an embodiment of the present invention.

Referring to FIG. 11, the vertical brace 172 includes a pitched top portion, wherein the angled support shaft 173 extends from one side, and a cross brace 171 extends from another side thereof. The vertical brace 172 includes an extension portion 192 to which the cross brace 171 is attached. More specifically, the cross brace 171 includes a tapered portion 191 at and end thereof. The tapered portion 191 includes a slot 193 which corresponds to a hole 194 in the extension portion 192. A fixing device 195, such as screw or bolt, is positioned through the slot and into the hole 194. The size of the slot 193 is larger than the fixing device 195 to allow adjustment of the length of the cross brace 171, depending on the width of a lawnmower 20. In an alternative embodiment, the extension portion 192 is omitted and a threaded hole is formed in the body of the vertical brace 172 to receive a fixing device 195, such as a screw.

The other end of the cross brace 171 attaches to a left hinge plate 27 and is angled so as to be flush with a surface of the left hinge plate 27. The cross brace 171 is welded to the left hinge plate 27, or fixed to the left hinge plate using screws, bolts, or other fixing device.

Material for the attachment device 100 can be any material able to provide structural support for the weight of an edge trimmer, including, for example, steel, aluminum, and/or appropriate metal alloys or plastics.

The attachment device 100, according to the embodiments of the present invention, when mounted on a lawnmower, allows, for example, use of a lawnmower as a stand-alone device with no edge trimmer attached, cutting of higher vegetation in front of the lawnmower so as to avoid stalling of the lawnmower, variation of height, depth, pitch and yaw for all types of edging heights, simultaneous mowing and edging, and quick removal of an edge trimmer from the attachment device using, for example, the wing nuts and hinged clamps. The attachment device also does not take up extra storage space, and is easy to install at little expense.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. A device for mounting an edge trimmer to a lawnmower having front, rear, left and right sides, wherein a width of the lawnmower is between the right and left sides, the device comprising:
    a front part coupled to the lawnmower; and
    a rear part coupled to the lawnmower, wherein the front and rear parts include respective front and rear clamps for receiving a shaft of the edge trimmer, and wherein the front clamp is adjustable to be fixed at different positions along a first axis, and wherein the front clamp is fixed to a bracket, the bracket being fixable at different positions along a second axis substantially perpendicular to the first axis, and being fixable at different angles with respect to a third axis, wherein the rear part comprises a vertical branch coupled to the lawnmower adjacent a first corner formed by the rear and one of the left or right sides, first angled branch angled with respect to and extending from the vertical branch away from the lawnmower beyond one of the left or right sides, and a second angled branch angled with respect to the vertical branch, wherein the second angled branch extends from the vertical branch across substantially the width of the lawnmower and is coupled to the lawn mower adjacent a second corner formed by the rear and the remaining one of the left or right sides.

2. The device as recited in claim 1, wherein the rear clamp is adjustable to be fixed at different positions along the first axis, and at different angles with respect to the third axis.

3. The device as recited in claim 2, wherein the rear clamp is fixed to a bracket that rotates to and is fixable at the different angles.

4. The device as recited in claim 2, wherein the rear clamp is fixed to a bracket that moves to and is fixable at the different positions.

5. The device as recited in claim 4, wherein another vertical branch extends from the first angled branch, and the first angled branch is oriented at an angle with respect to a base of the lawnmower.

6. The device as recited in claim 5, wherein the bracket which is fixed to the rear clamp is fixable to the another vertical branch aligned substantially parallel to the bracket.

7. The device as recited in claim 1, wherein the front and rear clamps each include top and bottom portions that are attached to each other by a hinge to open and close the clamps.

8. The device as recited in claim 1, wherein an extension length of the second angled branch is adjustable.

9. A device for mounting an edge trimmer to a lawnmower having front, rear, left and right sides, wherein a width of the lawnmower is between the right and left sides, the device comprising:
    a front clamp mounted to the lawnmower; and
    a rear clamp mounted to the lawnmower, wherein the front and rear clamps receive and support a shaft of the edge trimmer, and are adjustable to different angles with respect to a first axis substantially parallel to a surface on which the lawnmower rests, wherein the front clamp is fixed to a bracket that rotates to and is fixable at the different angles, and the bracket being further moveable to be fixed at different positions along a second axis substantially perpendicular to the first axis, wherein the rear clamp is mounted to a rear support, the rear support comprising a vertical branch coupled to the lawnmower adjacent a first corner formed by the rear and one of the left or right sides, a first angled branch angled with respect to and extending from the vertical branch away from the lawnmower beyond one of the left or right sides, and a second angled branch angled with respect to the vertical branch, wherein the second angled branch extends from the vertical branch across substantially the width of the lawnmower and is coupled to the lawnmower adjacent a second corner formed by the rear and the remaining one of the left or right sides.

10. The device as recited in claim 9, wherein the rear clamp is adjustable to different positions along the second axis.

11. The device as recited in claim 9, wherein the front and rear clamps are adjustable to different positions along a third axis.

12. The device as recited in claim 9, wherein the rear clamp is fixed to a bracket that rotates to and is fixable at the different angles.

13. The device as recited in claim 10, wherein the rear clamp is fixed to a bracket that moves to and is fixable at the different positions.

14. The device as recited in claim 9, wherein the front and rear clamps each include top and bottom portions that are attached to each other by a hinge to open and close the clamps.

15. The device as recited in claim 9, wherein the rear clamp is aligned with the front clamp so that the shaft of the edge trimmer received by the front and rear clamps extends across the front side of the lawnmower to one of the right or left sides of the lawnmower.

16. A device for mounting an edge trimmer to a lawnmower having front, rear, left and right sides, wherein a width of the lawnmower is between the right and left sides, the device comprising:
  a clamp mounted to the lawnmower, wherein the clamp receives and supports a shaft of the edge trimmer, and is adjustable to different angles with respect to a first axis substantially parallel to a surface on which the lawnmower rests, wherein the clamp is fixed to a bracket that rotates to and is fixable at the different angles, and the bracket being further moveable to be fixed at different positions along a second axis substantially perpendicular to the first axis, wherein the clamp is mounted to a support portion, the support portion comprising a vertical branch mounted to the lawnmower adjacent a first corner formed by the rear and one of the left or right sides, a first angled branch angled with respect to and extending from the vertical branch away from the lawnmower beyond one of the left or right sides, and a second angled branch angled with respect to the vertical branch, wherein the second angled branch extends from the vertical branch across substantially the width of the lawnmower and is mounted to the lawnmower adjacent a second corner formed by the rear and the remaining one of the left or right sides.

17. A device for mounting an edge trimmer to a lawnmower having front, rear, left and right sides, wherein a width of the lawnmower is between the right and left sides, the device comprising:
  a front part coupled to the lawnmower; and
  a rear part coupled to the lawnmower, wherein the front and rear parts include respective front and rear clamps for receiving a shaft of the edge trimmer, and wherein the front clamp is adjustable to be fixed at different positions along an axis, wherein the rear part comprises a vertical branch coupled to the lawnmower adjacent a first corner formed by the rear and one of the left or right sides, a first angled branch angled with respect to and extending from the vertical branch away from the lawnmower beyond one of the left or right sides, and a second angled branch angled with respect to the vertical branch, wherein the second angled branch extends from the vertical branch across substantially the width of the lawnmower and is coupled to the lawnmower adjacent a second corner formed by the rear and the remaining one of the left or right sides.

\* \* \* \* \*